(12) United States Patent
Liu et al.

(10) Patent No.: US 11,687,777 B2
(45) Date of Patent: Jun. 27, 2023

(54) CERTIFIABLY ROBUST INTERPRETATION

(71) Applicants: International Business Machines Corporation, Armonk, NY (US); Rensselaer Polytechnic Institute, Troy, NY (US)

(72) Inventors: Ao Liu, Troy, NY (US); Sijia Liu, Somerville, MA (US); Bo Wu, Cambridge, MA (US); Lirong Xia, Troy, NY (US); Qi Cheng Li, Beijing (CN); Chuang Gan, Cambridge, MA (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 143 days.

(21) Appl. No.: 17/005,144

(22) Filed: Aug. 27, 2020

(65) Prior Publication Data
US 2022/0067505 A1 Mar. 3, 2022

(51) Int. Cl.
*G06N 3/08* (2023.01)
*G06F 16/56* (2019.01)
(Continued)

(52) U.S. Cl.
CPC .............. *G06N 3/08* (2013.01); *G06F 16/56* (2019.01); *G06F 18/21* (2023.01); *G06T 3/4046* (2013.01);
(Continued)

(58) Field of Classification Search
CPC ........ G06N 3/08; G06F 16/56; G06K 9/6217; G06T 3/4046; G06T 5/002; G06T 2207/20084
(Continued)

(56) References Cited

U.S. PATENT DOCUMENTS

| 8,619,984 B2 | 12/2013 | McSherry et al. |
| 9,672,364 B2 | 6/2017 | Zhang et al. |

(Continued)

FOREIGN PATENT DOCUMENTS

| CN | 108805039 A | 11/2018 |
| CN | 109254274 A | 1/2019 |
| WO | WO2019211497 A3 | 1/2020 |

OTHER PUBLICATIONS

Dogan ("A Weighted Majority Voting Ensemble Approach for Classification", IEEE 2019) (Year: 2019).*

(Continued)

*Primary Examiner* — Mark Roz
(74) *Attorney, Agent, or Firm* — Anthony Curro; Michael J. Chang, LLC

(57) ABSTRACT

Interpretation maps of convolutional neural networks having certifiable robustness using Rényi differential privacy are provided. In one aspect, a method for generating an interpretation map includes: adding generalized Gaussian noise to an image x to obtain T noisy images, wherein the generalized Gaussian noise constitutes perturbations to the image x; providing the T noisy images as input to a convolutional neural network; calculating T noisy interpretations of output from the convolutional neural network corresponding to the T noisy images; re-scaling the T noisy interpretations using a scoring vector υ to obtain T re-scaled noisy interpretations; and generating the interpretation map using the T re-scaled noisy interpretations, wherein the interpretation map is robust against the perturbations.

20 Claims, 8 Drawing Sheets

(51) Int. Cl.
  *G06T 3/40* (2006.01)
  *G06T 5/00* (2006.01)
  *G06F 18/21* (2023.01)
(52) U.S. Cl.
  CPC .... *G06T 5/002* (2013.01); *G06T 2207/20084* (2013.01)
(58) Field of Classification Search
  USPC .......................................................... 382/156
  See application file for complete search history.

(56) References Cited

U.S. PATENT DOCUMENTS

| | | | |
|---|---|---|---|
| 10,229,282 | B2 | 3/2019 | Sierra et al. |
| 10,496,369 | B2 | 12/2019 | Guttmann |
| 2016/0203333 | A1 | 7/2016 | Fawaz et al. |
| 2017/0109628 | A1 | 4/2017 | Gokmen et al. |
| 2019/0012581 | A1 | 1/2019 | Honkala et al. |
| 2019/0156057 | A1 | 5/2019 | Nissim Kobliner et al. |
| 2020/0218932 | A1 | 7/2020 | Hensman et al. |

OTHER PUBLICATIONS

Klingner ("Improved Noise and Attack Robustness for Semantic Segmentation by Using Multi-Task Training With Self-Supervised Depth Estimation", IEEE Jun. 2020) (Year: 2020).*
Liang, "Image Pre-Classification Based on Saliency Map for Image Retrieval", IEEE 2009 (Year: 2009).*
Montavon et al., "Methods for interpreting and understanding deep neural networks," Digital Signal Processing 73, pp. 1-15 (2018) (published Oct. 2017).
C. Dwork et al., "The algorithmic foundations of differential privacy," Foundations and Trends® in Theoretical Computer Science, vol. 9, No. 3-4, Aug. 2014, pp. 211-407.
J. Heo et al., "Fooling Neural Network Interpretations via Adversarial Model Manipulation," NeurIPS Feb. 2019 (12 pages).
Simonyan et al. "Very Deep Convolutional Networks for Large-Scale Image Recognition," arXiv: 1409. 1556 Apr. 2015 (14 pages).
Dumitru M. Batinetu-Giurgiu et al., "A generalization of Radon's Inequality," Creative Math & Inf. 19 (2010), No. 2, 116-120.
Ruth Fong et al., "Understanding Deep Networks via Extremal Perturbations and Smooth Masks," Proceedings of the IEEE International Conference on Computer Vision Oct./Nov. 2019 (10 pages).
Simonyan et al., "Deep Inside Convolutional Networks: Visualising Image Classification Models and Saliency Maps," arXiv: 1312.6034, Dec. 2013 (8 pages).
Yu-Xiang Wang et al., "On-Average KL-Privacy and its equivalence to Generalization for Max-Entropy Mechanisms," arXiv:1605.02277, May 2016 (19 pages).
Jianming Zhang et al., "Top-down Neural Attention by Excitation Backprop," arXiv:1608.00507, Aug. 2016 (21 pages).
Pascal-Network.org, accessed Aug. 27, 2020 (4 pages).
Pinot, R. et al., (2019). "A unified view on differential privacy and robustness to adversarial examples," arXiv preprint arXiv:1906.07982, Jun. 2019 (6 pages).
Bai Li et al., "Certified Adversarial Robustness with Additive Noise," 33rd Conference on Neural Information Processing Systems (NeurIPS 2019) Dec. 2019 (15 pages).
Ghorbani et al., "Interpretation of Neural Networks Is Fragile," The Thirty-Third AAAI Conference on Artificial Intelligence (AAAI-19), pp. 3681-3688 (Jul. 2019).
Singh et al., "On the Benefits of Attributional Robustness," arXiv:1911.13073 (Dec. 2019) (14 pages).
Levine et al., "Certifiably Robust Interpretation in Deep Learning," arXiv:1905.12105v3 (Oct. 2019) (24 pages).
Mironov, "Renyi Differential Privacy," 2017 IEEE 30th Computer Security Foundations Symposium, pp. 263-275 (Aug. 2017).

* cited by examiner

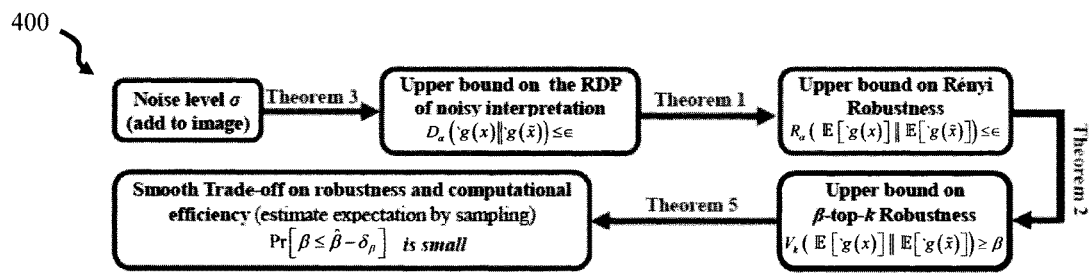

FIG. 4

| Prior knowledge | Distribution of noise | Maximum attack size $L$ without violating $\beta$-top-$k$ robustness |
|---|---|---|
| $d_{prior} = 1$ | Laplacian Distribution | $L = \sigma \cdot \sup_{\alpha > 1} \in_\alpha^{-1} (\in_{robust} (\alpha))$ |
| $d_{prior} \in (1,2]$ | Gaussian Distribution | $L = \sigma \cdot \sup_{\alpha > 1} \sqrt{2 \in_{robust} (\alpha) / \alpha}$ |
| $d_{prior} \in (2, \infty]$ | GND with $b = d^*$ | $L = \sigma \cdot \exp\left(-1\left(d > 2\left\lceil\frac{\ln n}{2}\right\rceil\right)\right) \cdot \in_{d^*}^{-1} \left(\lim_{\alpha \to 1+} \in_{robust} (\alpha)\right)$ |

FIG. 5

CERTIFIABLY ROBUST INTERPRETATION

FIELD OF THE INVENTION

The present invention relates to interpretation maps of convolutional neural networks, and more particularly, to interpretation maps of convolutional neural networks having certifiable robustness using Rényi differential privacy.

BACKGROUND OF THE INVENTION

Convolutional neural networks have been successfully demonstrated on a variety of different computer vision applications, such as image classification, object detection, and semantic segmentation. With each of these applications, it is important to understand why the convolutional neural network makes the correct prediction.

With computer vision applications, an interpretation map is used to explain which part of an input image plays a more important role in the prediction of convolutional neural networks. However, it has been shown that many interpretation maps such as Simple Gradient, Integrated Gradient, DeepLIFT (Deep Learning Important FeaTures) and Grad-Cam (Gradient-weighted Class Activation Mapping) are vulnerable to imperceptible input perturbations. See, for example, Ghorbani et al., "Interpretation of Neural Networks Is Fragile," The Thirty-Third AAAI Conference on Artificial Intelligence (AAAI-19), pp. 3681-3688 (July 2019). In other words, slight perturbations to an input image can undesirably cause a significant discrepancy in its coupled interpretation map, while keeping the predicted label unchanged. These slight perturbations can be imperceptible to the human eye and can be generated by measurement bias or by adversaries (i.e., adversarial perturbations).

Perturbations can create confusion between the model interpreter and the classifier, which diminishes the trustworthiness of systems that use the interpretations in downstream actions such as making medical recommendations, source code captioning, and transfer learning. Thus, the robustness of the interpretation maps against perturbations is essential.

Differential privacy (DP) has recently been introduced as a tool to improve the robustness of machine learning algorithms Differential privacy-based robust machine learning processes can provide theoretical robustness guarantees against adversarial attacks. Rényi differential privacy (RDP) is a generalization of the standard notion of DP. It has been proven that analyzing the robustness of convolutional neural networks using RDP can provide a stronger theoretical guarantee than standard DP. See, for example, Bai et al., "Certified Adversarial Robustness with Additive Noise," $33^{rd}$ Conference on Neural Information Processing Systems (NeurIPS 2019) (hereinafter "Bai"). For instance, as provided in Bai, model robustness based on Rényi divergence between the outputs of models for natural and adversarial examples shows a higher upper bound on the tolerable size of perturbations as compared to standard DP.

Thus, RDP-based techniques for certifiable prediction robustness in the interpretation maps of convolutional neural networks would be desirable.

SUMMARY OF THE INVENTION

The present invention provides interpretation maps of convolutional neural networks having certifiable robustness using Rényi differential privacy. In one aspect of the invention, a method for generating an interpretation map is provided. The method includes: adding generalized Gaussian noise to an image x to obtain T noisy images, wherein the generalized Gaussian noise constitutes perturbations to the image x; providing the T noisy images as input to a convolutional neural network; calculating T noisy interpretations of output from the convolutional neural network corresponding to the T noisy images; re-scaling the T noisy interpretations using a scoring vector $\upsilon$ to obtain T re-scaled noisy interpretations; and generating the interpretation map using the T re-scaled noisy interpretations, wherein the interpretation map is robust against the perturbations.

Advantageously, the resulting interpretation map has certifiable robustness against perturbations which can be generated by measurement bias or even by adversaries, i.e., adversarial perturbations, and which can be imperceptible to the eye. However, without such a robustness interpretation, these perturbations can lead to a significant discrepancy in the associated interpretation map.

The generalized Gaussian noise can be drawn from a generalized normal distribution $\mathcal{G}(\mu,\sigma,b)$. For instance, a random variable X follows the generalized normal distribution $\mathcal{G}(\mu,\sigma,b)$ if its probability density function is:

$$\frac{b \cdot \sqrt{\frac{\Gamma(3/b)}{\Gamma(1/b)}}}{2\sigma\Gamma(1/b)} \cdot \exp\left[-\left(\sqrt{\frac{\Gamma(3/b)}{\Gamma(1/b)}} \cdot \frac{|x-\mu|}{\sigma}\right)^b\right],$$

wherein $\mu$ correspond to an expectation of X, $\sigma$ correspond to a standard deviation of X and b correspond to a shape factor of X.

Introducing this generalized Gaussian noise to the input image generates T 'votes,' which are then aggregated using the scoring vector $\upsilon$. The scoring vector $\upsilon$ can be designed according to a sigmoid function. According to an exemplary embodiment, the scoring vector $\upsilon=(\upsilon_1, \ldots, \upsilon_n)$. By way of example only, $\upsilon_1 \geq \ldots \geq \upsilon_n$ can be set for the scoring vector $\upsilon$.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary workflow illustrating the robustness of the expected output from the present Rényi-Robust-Smooth approach according to an embodiment of the present invention;

FIG. 5 is a diagram illustrating the theoretical β-top-k robustness for the present interpretation maps when the defender has different prior knowledge about the perturbation types according to an embodiment of the present invention;

DETAILED DESCRIPTION OF PREFERRED EMBODIMENTS

Figure 1:
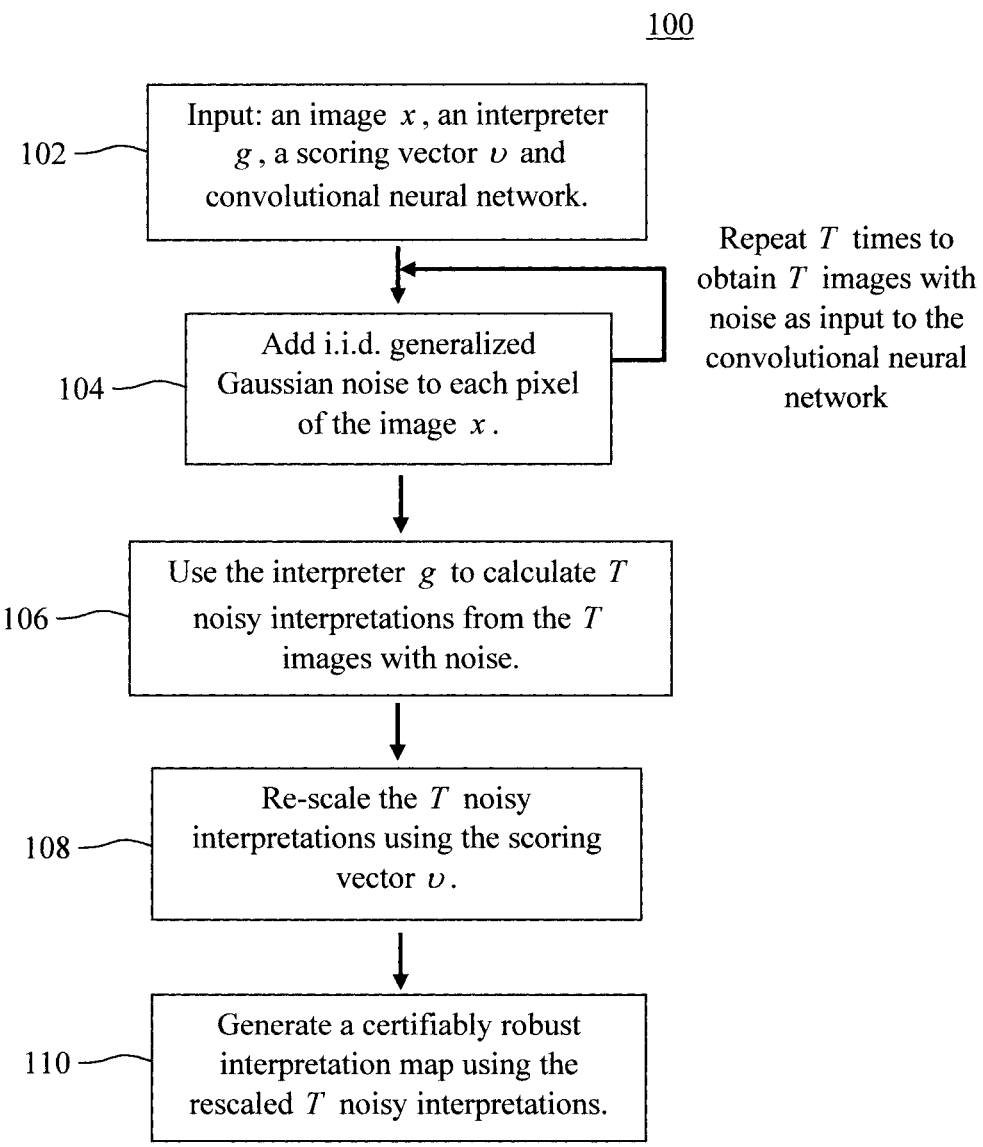
FIG. 1 is a diagram illustrating an exemplary methodology for generating a certifiably robust interpretation map according to an embodiment of the present invention.

As provided above, many common interpretation maps of convolutional neural networks are vulnerable to external perturbations. For instance, slight perturbations to an input image, which may even be imperceptible to the human eye, can lead to a significant discrepancy in the associated interpretation map. These perturbations can be generated by measurement bias or even by adversaries, i.e., adversarial perturbations.

Advantageously, provided herein are Rényi differential privacy (RDP)-based techniques for certifiable prediction robustness against such perturbations. An RDP-based process can guarantee that its output distribution is insensitive to small perturbations of the input. In the context of the present invention, the term 'privacy' generally refers to an amount of information that is known by adversaries from the output. In other words, the more information known by adversaries the less privacy there is, and vice versa. Advantageously, as will be described in detail below, generalized Gaussian noise is added to an image to obtain T noisy images, which are then re-scaled using a scoring vector. The interpretation map generated from the re-scaled noisy images is certifiably robust against external perturbations.

Notably, the present RDP-based interpretation approach offers provable and certifiable top-k robustness. That is, the top-k important attributions of the interpretation map are provably robust under any input perturbation with bounded $\ell_d$-norm (for any d≥1, including d=∞). Further, the present RDP-based interpretation approach offers ~10% better experimental robustness than existing approaches in terms of the top-k attributions, and can provide a smooth tradeoff between robustness and computational efficiency. Thus, the certifiably robust interpretation map generated in accordance with the present techniques is also referred to herein as a Rényi-Robust-Smooth map. Experimentally, its top-k attributions are twice more robust than existing approaches when the computational resources are highly constrained.

As will be described in detail below, digital images are provided as input to a convolutional neural network for analysis such as for classification. By way of example only, if an input digital image provided to the convolutional neural network is that of a butterfly, then ideally the convolutional neural network outputs the classification (Butterfly). As highlighted above, interpretation maps are used to show how important the pixels of the input image are in the process of the image classification.

One important aspect of this process is whether the predictions made by the convolutional neural network are trustworthy. For instance, if slight imperceptible perturbations to the input image can cause vastly different interpretations and potential misclassification or misidentification of the image (see above), then this calls into question the trustworthiness of the predictions. Advantageously, the present techniques provide certifiably robust interpretation maps against $\ell_d$-norm perturbations, where d∈[1,∞] (i.e., d∈[1, ∞] represents [1,∞)∪{∞}). Advantageously, the defender need not know the type of perturbation, as long as it is an $\ell_d$-norm perturbation. However, a stronger robustness guarantee can be provided if the exact perturbation type is known. The term 'defender' as used herein refers to a user(s) of the present techniques to defend against adversarial (or other) perturbations to the input image provided, e.g., by an adversary. The term 'perturbation type' generally refers to the method used to generate the adversarial perturbations.

In the following description, the interpretations of a convolutional neural network for image classification are used as an illustrative, non-limiting example, where the input is a digital image x, and the output is a label in C. An interpretation of this convolutional neural network explains why the convolutional neural network makes this decision by showing the importance of the features in the classification. An interpreter $g: \mathbb{R}^n \times C \to \mathbb{R}^n$ maps the (image, label) pairs to an n-dimensional interpretation map. Both the input image x and interpretation map m are treated as vectors of length n. The dimension of the output can be different from that of the input. $\mathbb{R}^n$ is used to simplify the notation. The output of h consists of pixel-level attribution scores, which reflect the impact of each pixel on making the prediction. Because the perturbations will not change the prediction of the convolutional neural network, the label part of input may be omitted when the context is clear (one input of the interpretation is the classification, i.e., the prediction of the neural network). When perturbations are introduced (e.g., by an adversary), x is replaced with its perturbed version x while keeping the predicted label unchanged. It is assumed that the perturbation is constrained by $\ell_d$-norm $\|x-\tilde{x}\|_d \triangleq (\Sigma_{i=1}^n |x_i - \tilde{x}_i|^d)^{1/d} \leq L$. When d=∞, the constraint becomes $\max_i |x_i - \tilde{x}_i| \leq L$.

According to an exemplary embodiment, interpretation robustness is measured by the overlapping ratio between the top-k components of g (x, C) and the top-k components of g (x̃,C). Here, $V_k(g(x,C), g(\tilde{x},C))$ is used to denote this ratio. For example, $V_2((1, 2, 3), (2, 1, 2))=0.5$ indicates that the $2^{nd}$ and $3^{rd}$ components are the top-2 components of (1, 2, 3) while the $1^{st}$ and $3^{rd}$ components are the top-2 components of (1, 2, 3). It is notable that the relative order between top-k components is not taken into account.

To formally define the top-k overlapping ratio, the set of top-k component $T_k(\cdot)$ of a vector is first defined as, $$T_k(x) \triangleq \{x: x \in x' \#\{x': x' \in x' x' \geq x\} \leq k\}. \quad (1)$$

Using the above notations, the top-k overlap ratio $V_k$ between any pair of vectors x and x̃ is then defined as:

$$V_k(x, \tilde{x}) \triangleq \frac{1}{T}(\#[T_k(x) \cap T_k(\tilde{x})]). \quad (2)$$

In one exemplary embodiment, β-Top-k Robustness (interpretation robustness) is defined as follows. For a given input x with label C, an interpretation method g(·,C) is β-Top-k robust to an $\ell_d$-norm perturbation of size L if for any x̃ s.t. $\|x-\tilde{x}\|_d \leq L$, $$V_k(g(x,C), g(\tilde{x},C)) \geq \beta. \quad (3)$$

As highlighted above, RDP is a novel generalization of standard DP. RDP uses Rényi divergence as the measure of difference between distributions. For instance, for two distributions P and Q with the same support S, the Rényi divergence of order $\alpha > 1$ is:

$$D_\alpha(P\|Q) \triangleq \frac{1}{\alpha-1}\ln \mathbb{E}_{x \sim Q}\left(\frac{P(x)}{Q(x)}\right)^\alpha \text{ and } D_\infty = \sup_{x \in S}\ln\frac{P(x)}{Q(x)}.$$

In one exemplary embodiment, a generalized RDP is adopted by considering 'adjacent' inputs whose $\ell_d$ distance is no larger than L. Standard RDP assumes that the $\ell_0$-norm of adjacent inputs is no more than 1. For instance, a randomized function 'g is $(\alpha, \in, L)$-Rényi differentially private to $\ell_d$ distance, if for any pair of inputs x and $\tilde{x}$ s.t. $\|x-\tilde{x}\|_d \leq L$, $$D_\alpha('g(x)\|'g(\tilde{x})) \leq \in. \quad (4)$$

As in standard DP, smaller values of E correspond to a more private 'g(·). RDP generalizes the standard DP, which is RDP with $\alpha = \infty$. As provided above, x represents the input image and 'g represents a (randomized) interpretation algorithm (an ' sign is added on top of all randomized functions).

It is assumed that the randomized function 'g(·) is Rényi differentially private. Thus, for any input x, 'g(x) (which is a distribution) is insensitive to small perturbations on x. For instance, consider a deterministic algorithm $h(x) \triangleq \mathbb{E}_{\cdot g}['g(x)]$ that outputs the expectation of 'g(x). It is thus intuitive that h(x) is also insensitive to small perturbations on x. In other words, the RDP property of 'g(·) leads to the robustness of h(·).

A new robustness notion, Rényi robustness, is provided herein whose merits are two-fold. First, the $(\alpha, \in, L)$-RDP property of 'g(·) directly leads to the $(\alpha, \in, L)$-Rényi robustness on E['g(·)]. Thus, like RDP, Rényi robustness also has many desirable properties. Second, Rényi robustness is closely related to other robustness notions. For instance, if setting $\alpha = \infty$, then the robustness parameter $\in$ measures the average relative change of output when the input is perturbed. Further, as will be described in detail below, Rényi robustness is closely related to $\beta$-top-k robustness.

According to an exemplary embodiment, for a given input $x \in A$, a deterministic algorithm $h(\cdot): A \to [0,1]^n$ is $(\alpha, \in, L)$-Rényi robust to $\ell_d$-norm perturbation if for any x and $\tilde{x}$ s.t. $\|x-\tilde{x}\|_d \leq L$, $$R_\alpha(h(x)\|h(\tilde{x})) \triangleq \qquad (5)$$

$$\frac{1}{\alpha-1}\ln\left(\prod_{i=1}^n h(\tilde{x})_i \left(\frac{h(x)_i}{h(\tilde{x})_i}\right)^\alpha\right) = \frac{1}{\alpha-1}\ln\left(\prod_{i=1}^n \frac{(h(x)_i)^\alpha}{(h(\tilde{x})_i)^{\alpha-1}}\right) \leq \in,$$

wherein $h(\cdot)_i$ refers to the i-th components of h(·).

Given the above overview, FIG. 1 is a diagram illustrating an exemplary methodology 100 for generating a certifiably robust interpretation map. The present approach to generating robust interpretation is inspired by voting. Namely, as will be described in detail below, T "voters" will be generated by introducing external noise to the input image. A voting rule will then be used to aggregate the outputs.

As shown in step 102, the inputs to the process are an image x, a base interpretation method g, a scoring vector $\upsilon$, a number of samples T, and a convolutional neural network. Thus, the image x may also be referred to herein as an 'input image'. According to an exemplary embodiment, the input image x is a digital image. In general, a digital image is composed of a collection of elements or pixels. Each pixel has associated therewith a numeric representation of its intensity or gray level. According to an exemplary embodiment, the number of samples T is user-defined and depends, for example, on the computation resources the user has.

As highlighted above, the interpreter g maps features in the input image x to an n-dimensional interpretation map. According to an exemplary embodiment, the interpreter g is a software tool that is used to provide how important the input pixels in the image x are in the output classification, e.g., via importance scores. For instance, the more important one pixel is, the larger its value will be in the interpretation maps, and vice versa.

As will be described in detail below, independently and identically distributed (i.i.d.) generalized Gaussian noise will be added to each pixel in the input image x to generate a plurality of noisy images from the input image x. Introducing this external noise to the input image generates T 'votes,' which are then aggregated using the scoring vector $\upsilon$.

Convolutional neural networks are a type of deep neural network that are often applied in computer vision applications. In machine learning and cognitive science, deep neural networks are a family of statistical learning models inspired by the biological neural networks of animals, and in particular the brain. Deep neural networks may be used to estimate or approximate systems and cognitive functions that depend on a large number of inputs and weights of the connections which are generally unknown.

Figure 2:
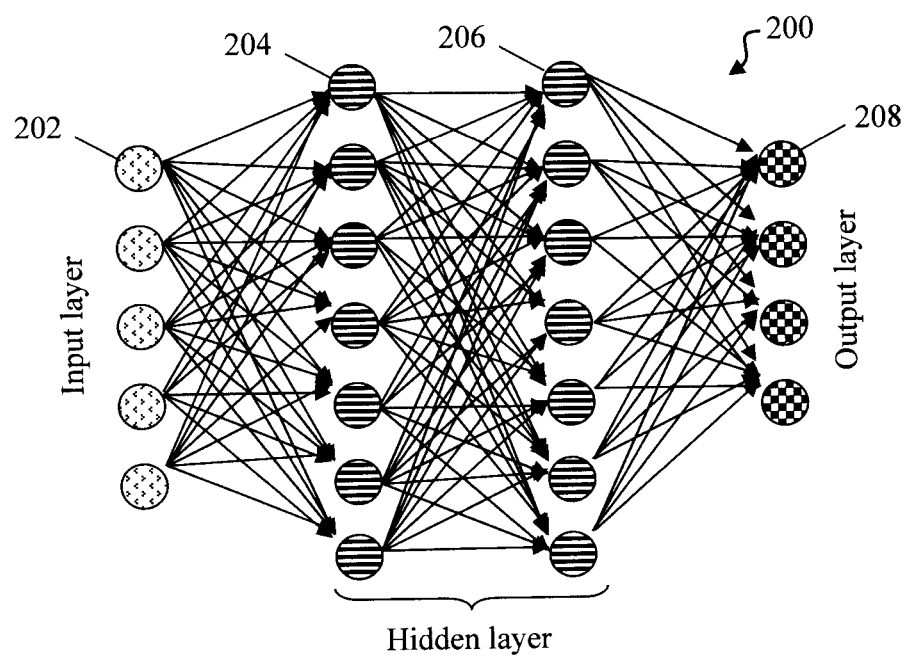
FIG. 2 is a schematic diagram illustrating an exemplary convolutional neural network according to an embodiment of the present invention.

Deep neural networks are often embodied as so-called "neuromorphic" systems of interconnected processor elements that act as simulated "neurons" that exchange "messages" between each other in the form of electronic signals. See, for example, FIG. 2 which provides a schematic illustration of an exemplary deep neural network 200. As shown in FIG. 2, deep neural network 200 includes a plurality of interconnected processor elements 202, 204/206 and 208 that form an input layer, at least one hidden layer, and an output layer, respectively, of the deep neural network 200. By way of example only, deep neural network 200 can be embodied in an analog cross-point array of resistive devices such as resistive processing units (RPUs).

Similar to the so-called 'plasticity' of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience, making deep neural networks adaptive to inputs and capable of learning. For example, a deep neural network for image recognition is defined by a set of input neurons (see, e.g., input layer 202 in deep neural network 200) which may be activated by the pixels of an input image. After being weighted and transformed by a function determined by the network's designer, the activations of these input neurons are then passed to other downstream neurons, which are often referred to as 'hidden' neurons (see, e.g., hidden layers 204 and 206 in deep neural network 200). This process is repeated until an output neuron is activated (see, e.g., output layer 208 in deep neural network 200). The activated output neuron determines what image was read.

Instead of utilizing the traditional digital model of manipulating zeros and ones, deep neural networks such as deep neural network 200 create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Referring back to methodology 100 of FIG. 1, in step 104 independently and identically distributed (i.i.d.) generalized Gaussian noise $\delta_1, \ldots, \delta_T \sim \mathcal{G}(0, \sigma^2 I, d^*)$ is added to each pixel of the input image x to obtain a noisy image. This added generalized Gaussian noise constitutes perturbations to the input image x. As is generally known in the art, i.i.d. Gaussian noise employs random variables that are uncorrelated and independent. In other words, the random variables are independent and identically distributed if each of the random variables has a same probability distribution as the other random variables, and all of the random variables are mutually independent.

Notably, the i.i.d. generalized Gaussian noise in step 104 is drawn from a generalized normal distribution (GND) $\mathcal{G}(\mu, \sigma, b)$. A random variable X follows the generalized normal distribution $\mathcal{G}(\mu, \sigma, b)$ if its probability density function is:

$$\frac{b \cdot \sqrt{\frac{\Gamma(3/b)}{\Gamma(1/b)}}}{2\sigma \Gamma(1/b)} \cdot \exp\left[-\left(\sqrt{\frac{\Gamma(3/b)}{\Gamma(1/b)}} \cdot \frac{|x-\mu|}{\sigma}\right)^b\right], \quad (6)$$

wherein $\mu$, $\sigma$ and b correspond to the expectation, standard deviation and shape factor of X, respectively, and $\Gamma(\cdot)$ refers to gamma functions. This GND generalizes Gaussian distributions (b=2) and Laplacian distribution (b=1).

The shape parameter d* is set according to the prior knowledge of the defender. It is assumed that the defender knows that the perturbations are based on $\ell_d$-norm wherein $d \leq d_{prior}$. For instance, $d_{prior} = \infty$ means the defender has no prior knowledge about the perturbations. According to an exemplary embodiment, the shape parameter d* is set according to the following setting:

$$d^* = \begin{cases} 1, & \text{when } d_{prior} = 1 \\ 2\left\lceil \frac{d_{prior}}{2} \right\rceil, & \text{when } 1 < d_{prior} \leq 2\left\lceil \frac{\ln n}{2} \right\rceil \\ 2\left\lceil \frac{\ln n}{2} \right\rceil, & \text{when } d_{prior} > 2\left\lceil \frac{\ln n}{2} \right\rceil \end{cases}$$

In other words, d* is the round-up of $d_{prior}$ to the next even number, except that d=1 or d is sufficiently large. An upper threshold is set on d* because $\ell_{\ln n}$-norm is close to $\ell_\infty$-norm in practice.

As shown in FIG. 1, step 104 is independently repeated T times on the input image x to obtain T images with noise (also referred to herein as 'noisy images'). The T noisy images are then provided as input to the convolutional neural network which will analyze the image data. By 'independent' it is meant that the generalized Gaussian noises added to the T noisy images are independent to each other. By way of example only, according to an exemplary embodiment, the value of T is from about 20 to about 200 and ranges therebetween. However, it is notable that the larger the value of T is, the less random the output interpretation will be, but also requires more computational resources.

In step 106, the interpreter g is used to calculate T noisy interpretation maps (or simply 'interpretations') '$g_t^*(x) \triangleq g(x+\delta_t)$ from the output of the convolutional neural network corresponding to the T noisy (input) images. As provided above, according to an exemplary embodiment, the interpreter g is a software tool that is used to provide how important the pixels in the input image x are in the output classification, e.g., via importance scores. For instance, the more important one pixel is, the larger its value will be in the interpretation maps, and vice versa. By way of example only, in one exemplary embodiment, the interpreter g converts the T noisy images into saliency maps. A saliency map is an image that illustrates the unique quality of each pixel in the image. Saliency maps simplify, or in some other way change, the representation of an image into something that is simpler and easier to analyze.

An interpretation map such as a saliency map is a mapping of abstract concepts such as predictions from a convolutional neural network into a form that a human user can understand and use. For instance, users can interpret data in the form of images or text that they can view/read to understand. On the other hand, data containing sequences of unknown words and/or symbols are abstract and cannot be interpreted by users. Thus, an interpreter is needed to convert the data to a human-understandable form. According to an exemplary embodiment, a commercially-available interpreter software such as DeepLIFT (Deep Learning Important FeaTures) and/or Integrated Gradients is used.

In step 108, the T noisy interpretations '$g_t^*$ are re-scaled (i.e., normalized) using a scoring vector $\upsilon = (\upsilon_1, \ldots, \upsilon_n)$ to obtain T re-scaled noisy interpretations. As will be described in detail below, the scoring vector $\upsilon$ is designed according to a sigmoid function. The T noisy interpretations '$g_t^*$ after re-scaling are denoted by '$g_t(x)$, where '$g_t(x)_i = \upsilon_j$ if and only if '$g_t^*(x)$ is ranked j-th in '$g_t^*(x)$. Without loss of generality, $\upsilon_1 \geq \ldots \geq \upsilon_n$ is set for the scoring vector $\upsilon$. This assumption guarantees that the pixels ranked higher in '$g_t(x)$ will contribute more to the Rényi-Robust-Smooth map.

In step 110, a certifiably robust interpretation map m is generated using the re-scaled T noisy interpretations '$g_t(x)$, i.e., $$m \triangleq \frac{1}{T} \sum_{t=1}^{T} g_t(x). \quad (7)$$

Namely, according to an exemplary embodiment, an averaging of the re-scaled T noisy interpretations is performed in step 110 to generate interpretation map m. By 'averaging' it is meant that every pixel of the output interpretation map m is the arithmetic average of the corresponding pixels in the re-scaled T noisy interpretations. Advantageously, the interpretations generated in accordance with the present techniques are certifiably robust against external perturbations. As highlighted above, small perturbations to the input image x that might be imperceptible to the human eye can undesirably lead to different interpretations. With the present techniques, however, the interpretations are robust to external perturbations meaning that the external perturbations do not change the interpretations.

Figure 3:
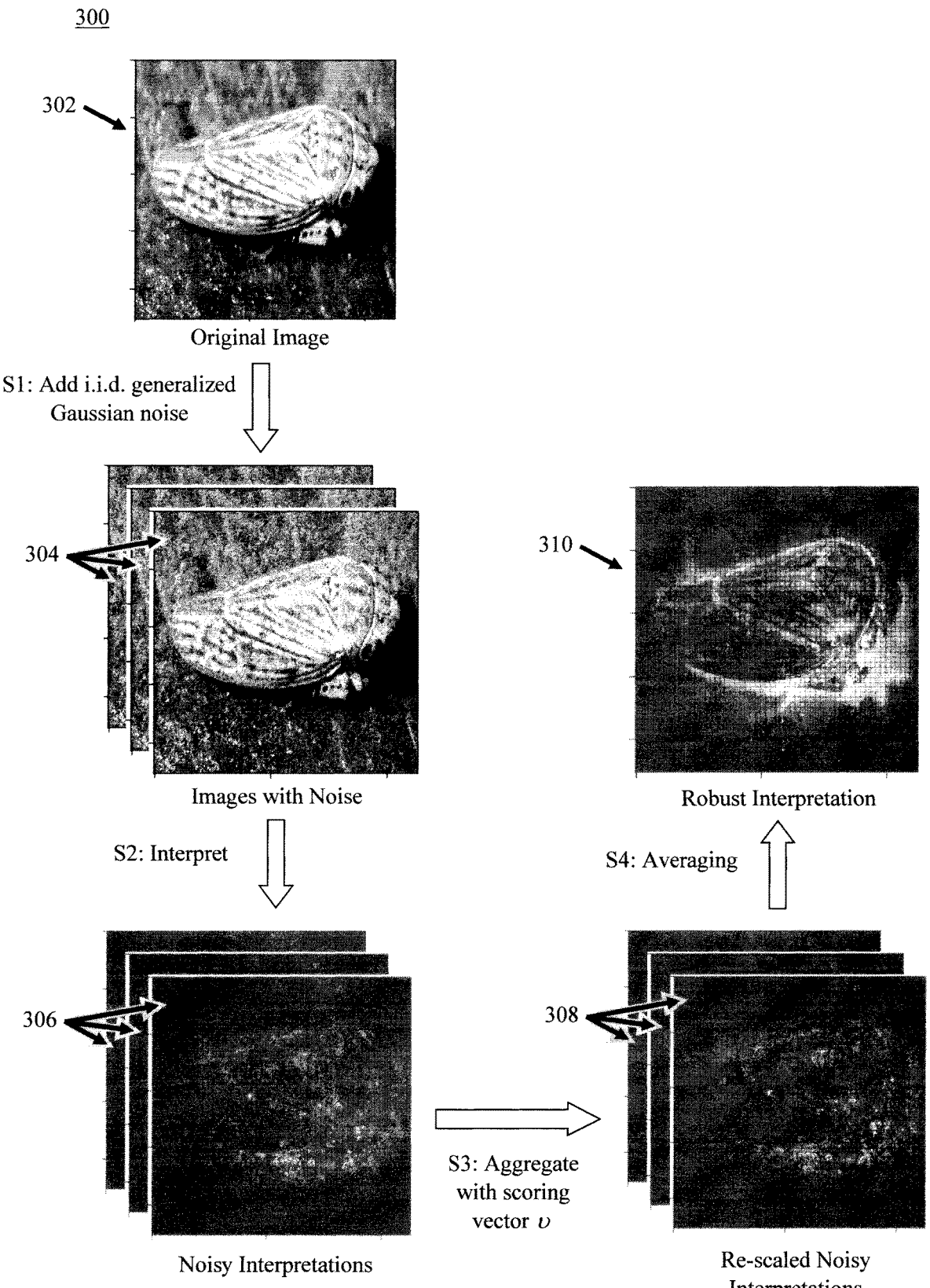
FIG. 3 is a diagram illustrating an exemplary implementation of the methodology of FIG. 1 according to an embodiment of the present invention.

An exemplary implementation of methodology 100 is now described by way of reference to FIG. 3. As shown in FIG. 3, methodology 300 for generating an interpretation map with certifiable robustness begins with a digital input image 302. As provided above, a digital image is composed of a collection of elements or pixels, each of which has associated therewith a numeric representation of its intensity or gray level. Input image 302 may also be referred to herein as the 'original image' since it is the image provided prior to any processing.

In step S1, i.i.d. generalized Gaussian noise is added to the input image 302. The i.i.d. generalized Gaussian noise constitutes perturbations to the input image 302. According to an exemplary embodiment, the i.i.d. generalized Gaussian noise is added to each pixel of the input image 302. In the same manner as described above, step S1 is independently repeated T times (e.g., from about 20 times to about 200 times and ranges therebetween) on the input image 302 to obtain T images with noise (i.e., T noisy images 304).

It is notable that these slight perturbations to the input image 302 are imperceptible to the human eye. For instance, if one compares input image 302 to the T noisy images 304 shown in FIG. 3, these images appear to be virtually identical. Thus, a viewer would not be able to detect that any changes to the images has occurred. However, without some robustness guarantee, the input image 302 and the T noisy images 304 can lead to vastly different interpretations.

The T noisy images 304 serve as input to a convolutional neural network which will analyze the image data, and in step S2 an interpreter is used to calculate T noisy interpretations 306 of the output from the convolutional neural network corresponding to the T noisy images 304. According to an exemplary embodiment, a commercially-available interpreter software such as DeepLIFT (Deep Learning Important FeaTures) and/or Integrated Gradients is used. According to an exemplary embodiment, the T noisy interpretations 306 are in the form of saliency maps.

In step S3, the T noisy interpretations 306 are re-scaled using a scoring vector $\upsilon$ to obtain T re-scaled noisy interpretations 308. According to an exemplary embodiment, the scoring vector $\upsilon=(\upsilon_1, \ldots, \upsilon_n)$, and $\upsilon_1 \geq \ldots \geq \upsilon_n$ is set for the scoring vector $\upsilon$.

In step S4, a certifiably robust interpretation map 310 is generated using the re-scaled T noisy interpretations 308. According to an exemplary embodiment, an averaging of the re-scaled T noisy interpretations is performed in step S4 to generate interpretation map 310. As provided above, averaging means that every pixel of the output interpretation map 310 is the arithmetic average of the corresponding pixels in the re-scaled T noisy interpretations 308.

The robustness of the expected output, denoted as $\mathbb{E}['g(x)]$, of the present Rényi-Robust-Smooth process is now described by way of reference to workflow 400 shown in FIG. 4. As shown in FIG. 4, the noise level σ added to the image x can guarantee the RDP property of 'g(x) (Theorem 3). In workflow 400, the RDP is connected with Rényi robustness (Theorem 1), and the Rényi robustness is connected with β-top-k robustness (Theorem 2). Then it is shown that the Rényi robustness parameter $\in_{robust}$ will have a larger probability to be large when the number of sample T becomes larger (Theorem 5). In the description that follows, the footnote t is eliminated to simplify the notation.

As highlighted above, the noise added to the image can guarantee the RDP property of 'g(x). See description of Theorem 3, below. According to the intuitions of the RDP-robustness connection described above, it is expected that $\mathbb{E}['g(x)]$ is robust to input perturbations. Here, $m=\mathbb{E}['g(x)]$ and $\tilde{m}=\mathbb{E}['g(x)]$.

As highlighted above, Theorem 1 connects RDP with Rényi robustness. Namely, if a randomized function $'g(\cdot)$ is $(\alpha, \in, L)$-RDP to $\ell_d$ distance, then $\mathbb{E}_{\cdot g}['g(\cdot)]$ is $(\alpha, \in, L)$-Rényi robust to $\ell_d$ distance.

As highlighted above, Theorem 2 connects Rényi robustness and β-top-k robustness. To simplify the notation, it is assumed that the Rényi-Robust-Smooth map $m=(m_1, \ldots, m_n)$ is normalized ($\|m\|_1=1$). Further, is used to denote the i-th largest component in m. $k_0 \lfloor (1-\beta)k \rfloor +1$ is used to denote the minimum number of changes to violet β-ratio overlapping of top-k (i.e., the overlapping ratio less than β). $S=\{k-k_0, \ldots, k+k_0+1\}$ is used to denote the set of last $k_0$, components in top-k and the top $k_0$, components out of top-k. With Theorem 2, function $h(\cdot)$ is held to be $(\alpha, \in, L)$-Rényi robust to $\ell_d$ distance. Then, $m=h(x)$ is β-Top-k robust to an $\ell_d$-norm perturbation of size L, if $$\in \leq \in_{robust}(\alpha; \beta, k; m) \triangleq -\ln\left(2k_0\left(\frac{1}{2k_0}\sum_{i\in S}(m_{i^*})^{1-\alpha}\right)^{\frac{1}{1-\alpha}} + \sum_{i\notin S} m_{i^*}\right). \quad (8)$$

In other words, Theorem 2 shows the level of Rényi robustness required by the β-top-k robustness condition. Regarding $\in_{robust}$, there are two terms inside of the $\ln(\cdot)$ function. The first term corresponds to the minimum information loss to replace $k_0$, items from the top-k. The second term corresponds to the unchanged components in the process of replacement.

Combining the results in Theorem 1 and Theorem 2, it is seen that β-top-k robustness can be guaranteed by the Rényi differential privacy property on the randomized interpretation algorithm $'g(x)=f_\upsilon, (g(x+\delta,C))$, where $f_\upsilon$ is the re-scaling function using scaling vector $\upsilon$. Next, the RDP property of 'g($\cdot$) is shown. In the following description, $\Gamma(\cdot)$ is used to denote the gamma function and $\mathbb{1}(\cdot)$ is used to denote the indicator function. The following equations are used to simplify notation, $$\in_a\left(\frac{L}{\sigma}\right) = \frac{1}{\alpha-1}\ln\left[\frac{\alpha}{\alpha-1}\exp\left(\frac{(\alpha-1)L}{\sqrt{2}\sigma}\right) + \frac{\alpha-1}{2\alpha-1}\exp\left(\frac{-\alpha L}{\sqrt{2}\sigma}\right)\right] \text{ and}$$

$$\in_{d^*}\left(\frac{L}{\sigma}\right) = \frac{1}{\Gamma(1/d^*)}\sum_{i=1}^{d^*/2}\binom{2i}{d^*}\left(\frac{L}{\sigma^*}\right)^{2i}\Gamma\left(\frac{d^*+1-2i}{d^*}\right),$$

where $\sigma^* = \sqrt{\frac{\Gamma(1/b)}{\Gamma(3/b)}}\sigma$.

Regarding noise level and RDP, Theorem 3 provides that for any re-scaling function $f_\upsilon(\cdot)$, $'g(x)=f_\upsilon(g(x+\delta))$ where $\delta \sim \mathcal{G}(0, \sigma^2 I, d^*)$. Then, 'g has the following properties with $\ell_d$ distance:

$$1\left(1, \in_{d^*}\left(\frac{L}{\sigma} \cdot \exp\left[\mathbb{1}\left(d > 2\left\lceil\frac{\ln n}{2}\right\rceil\right)\right]\right), L\right)\text{-RDP for all } d \geq 2, \text{ and}$$

-continued

2° for all $\alpha \geq 1$, $\left(\alpha, \frac{\alpha L^2}{2\sigma^2}, L\right)$-RDP when $d \in (1, 2]$ and $\left(\alpha, \in_\alpha \left(\frac{L}{\sigma}\right), L\right)$ when $d = 1$, wherein, according to the post processing property of RDP, $D_\alpha(\text{'g}(x)\|\text{'g}(\tilde{x})) \leq D_\alpha(x+\delta\|\tilde{x}+\delta)$. When $d \in [1,2]$, it is always the case that $d^* \geq d$ and $\|x-\tilde{x}\|_d \geq \|x-\tilde{x}\|_{d^*}$. Thus, all conclusion requiring $\|x-\tilde{x}\|_{d^*} \leq L$ will also hold when the requirement becomes $\|x-\tilde{x}\|_d \leq L$. Then, 2° of Theorem 3 follows by standard conclusions of RDP on Gaussian and Laplacian mechanisms. In Lemma 4 (see below), the RDP bound is proven for generalized normal mechanisms of even shape parameters. This bound can be directly applied to bound the KL-privacy of generalized Gaussian mechanisms.

Lemma 4: for any positive even shape factor b, letting $x \sim \mathcal{G}(0,\sigma,b)$ and $\tilde{x} \sim \mathcal{G}(L,\sigma,b)$ provides $$\lim_{\alpha \to 1+} D_\alpha(x\|\tilde{x}) = \in_{d^*}(L/\sigma).$$

When $$d \leq 2\left\lceil\frac{\ln n}{2}\right\rceil,$$

it is always the case that $d^* \geq d$ and 1° of this case holds according to the same reason as 2° (see above). When $$d > 2\left\lceil\frac{\ln n}{2}\right\rceil,$$

$\|x-\tilde{x}\|_{d^*} \leq n^{1/d^*-1/d} \cdot \|x-\tilde{x}\|_d \leq e \cdot \|x-\tilde{x}\|_d$. Thus, 1° of Theorem 3 also holds when $$d > 2\left\lceil\frac{\ln n}{2}\right\rceil.$$

Combining the conclusions of Theorem 1-3, the theoretical robustness of Rényi-Robust-Smooth shown in FIG. 5 is obtained. FIG. 5 is a table 500 illustrating the theoretical β-top-k robustness for $m = \mathbb{E}[\text{'g}(x)]$ when the defender has different prior knowledge $d_{prior}$ about the perturbation types. In table 500, $\in^{-1}(\cdot)$ denotes the inverse function of $\in(\cdot)$.

It has been assumed thus far that the value of $m = \mathbb{E}[\text{'g}(x)]$ can be computed efficiently. However, there may not even exist a closed form expression of m, and thus m may not be computed efficiently. Here, the robustness-computational efficiency trade-off is evaluated when m is approximated through sampling. That is, m is approximated using $\Sigma_{t=1}^T \text{'g}_t(x)$ (the same procedure as methodology 100). To simplify notation, $\hat{\beta}$ is used to denote the calculated top-k robustness from table 500. β is used to denote the real robustness parameter of m.

It is notable that the present approach will become more computational-efficient when the number of samples T becomes smaller. Theorem 5 shows that the Rényi robustness parameter $\in_{robust}$ will have a larger probability to be large when the number of sample T becomes larger. The conclusion on attack size L or robust parameter β follows by applying Theorem 5 to table 500 or Theorem 2, respectively. Namely, according to Theorem 5, letting $\hat{\in}_{robust}$ denote the estimated Rényi robustness parameter from T samples, then $$Pr[\in_{robust} \geq (1-\delta_\in)\hat{\in}_{robust}] \geq 1 - \text{negl}(T), \quad (9)$$

wherein negl($\cdot$) refer to the negligible function.

Figure 6:
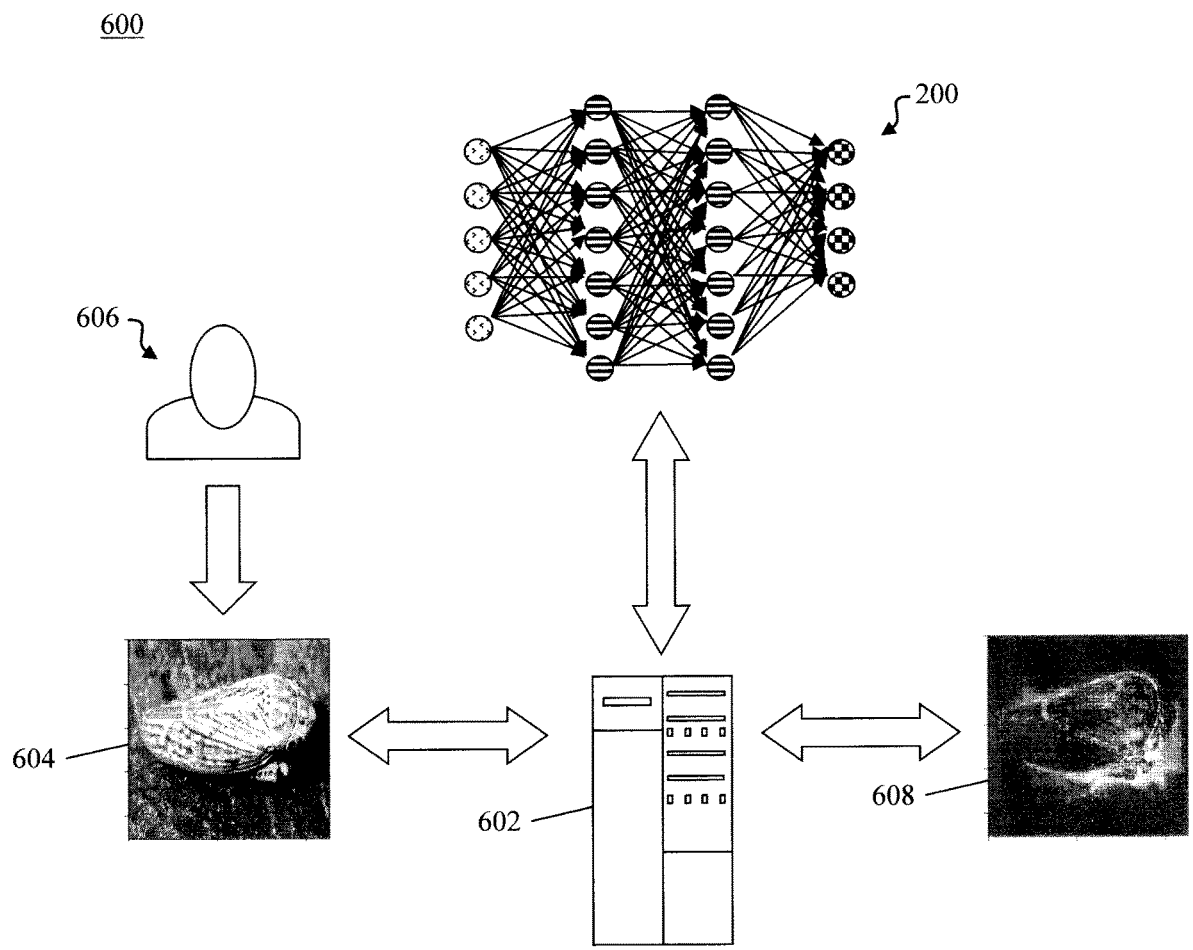
FIG. 6 is a diagram illustrating exemplary system for generating a certifiably robust interpretation map according to an embodiment of the present invention.

FIG. 6 is a diagram illustrating an exemplary system 600 for generating an interpretation map with certifiable robustness. As shown in FIG. 6, system 600 includes a computer-based apparatus 602 (such as a server) and a deep neural network such as deep neural network 200 described in conjunction with the description of FIG. 2, above. An exemplary apparatus that may be configured to serve as computer-based apparatus 602 is described in conjunction with the description of FIG. 7, below. According to an exemplary embodiment, deep neural network 200 is run on computer-based apparatus 602. Alternatively, deep neural network 200 is run on another computing infrastructure (not shown).

As provided above, a digital image x such as image 604 is provided as input to the present process. By way of example only, this original input image 604 can be provided by a user 606 to computer-based apparatus 602. Computer-based apparatus 602 is then configured to carry out one or more of the steps of methodology 100 of FIG. 1 (described above) to generate a certifiably robust interpretation map 608.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
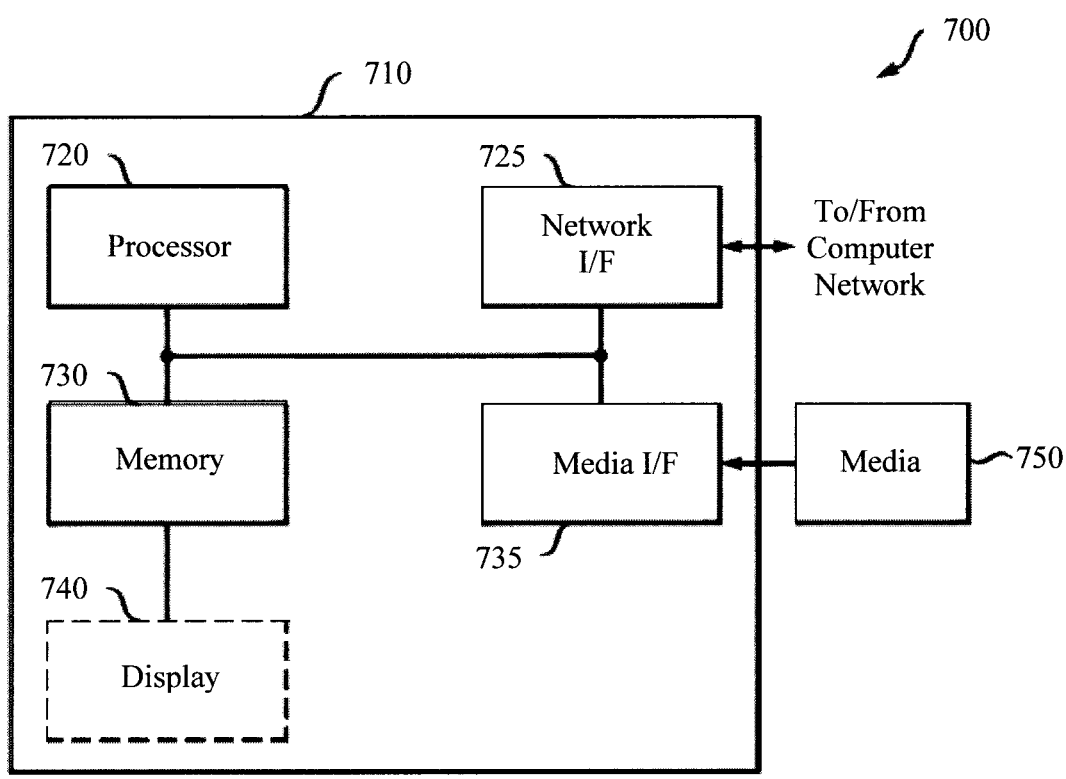
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 100 of FIG. 1 and/or one or more steps of methodology 300 of FIG. 3. For instance, according to an exemplary embodiment, apparatus 602 in system 600 of FIG. 6 may be embodied in apparatus 700.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

The present techniques are further illustrated by the following non-limiting examples. The robustness and interpretation accuracy of the present Rényi-Robust-Smooth process were evaluated experimentally. It was found that the present approach performs better in terms of both robustness and interpretation accuracy as compared to other approaches such Sparsified SmoothGrad (a sparsified version of the SmoothGrad method).

In this implementation, the PASCAL Visual Object Classes Challenge 2007 dataset (VOC2007) was used to evaluate both interpretation robustness and interpretation accuracy. The annotated object positions in VOC2007 were compared with the interpretation maps to benchmark the accuracy of the interpretation methods. The visual geometry group (University of Oxford) VGG-16 was adopted as the convolutional neural network backbone for all the experiments. See Simonyan et al., "Very Deep Convolutional Networks for Large-Scale Image Recognition," arXiv: 1409.1556 April 2015 (14 pages). Simple Gradient is used as the base interpretation method g (denoted as g (·) in the input of methodology 100—see above).

The evaluation was focused on the most challenging case of $\ell_d$-norm perturbation: a $\ell_\infty$-norm perturbation. The robustness and accuracy of the present process was evaluated under the standard $\ell_\infty$-norm perturbation against the top-k component of Simple Gradient. The detailed configuration of the $\ell_\infty$-norm perturbation on top-k overlap was as follows:

Inputs: An integer k, learning rate lr, an input image $x \in \mathbb{R}^n$; an interpretation method g (·,·), maximum $\ell_\infty$-norm perturbation L, and the number of iterations T.
Output: Adversarial example $\tilde{x}$.
Define $D(z) = -\Sigma_{i \in B} g(x)_i$.
Initialization: $x^0 = x$.

--- for t = 1 to T do $$x^t \leftarrow x^{t-1} + lr \cdot \frac{\nabla D(x^{t-1})}{\gamma}$$

if $\|x^t - x\|_d > \rho$ then $$x^t \leftarrow x + \rho \cdot \frac{x^t - x}{\|x^t - x\|_d}$$

end if
end for

---

Output: $\tilde{x} = \arg\max_{z \in \{x^0, \ldots, x^T\}} D(z)$.
In one exemplary implementation, the following parameters were used: $\ell_\infty$-norm perturbation size L=8/256≈0.03, learning rate lr=0.5 and the number of iterations T=300.

According to the noise setup described above, the shape factor of GND was set as d*=10 in consideration of the VOC2007 dataset image size. To compare with other approaches, the standard deviation of noise is fixed to be 0.1. The scoring vector υ used to aggregate "votes" is designed according to a sigmoid function. It is provided that $$v_i = \frac{1}{Z} \cdot [1 + e^{\eta \cdot (i - k^*)}]^{-1},$$

where $Z = \Sigma_{i'=1}^n [1 + e^{\eta \cdot (i' - k*)}]^{-1}$ is the normalization factor. k* and η are user-defined parameters to control the shape of υ, wherein $\eta = 10^{-4}$ is set for the purposes of the present description.

The β-top-k robustness of Rényi-Robust-Smooth was compared with Sparsified SmoothGrad. Rényi-Robust-Smooth gets not only tighter robustness bound, but stronger robustness against $\ell_\infty$-norm attack in comparison with the base interpretation method. For both Sparsified SmoothGrad and the present approach, the number of samples T was set to be 50.

Figure 8A:
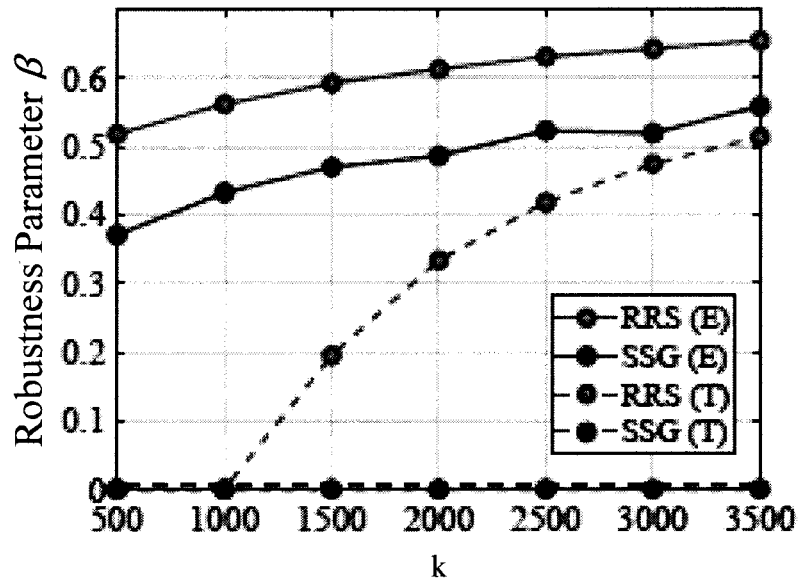
FIG. 8A is a diagram illustrating the β-top-k robustness of the present Rényi-Robust-Smooth approach according to an embodiment of the present invention.
Figure 8B:
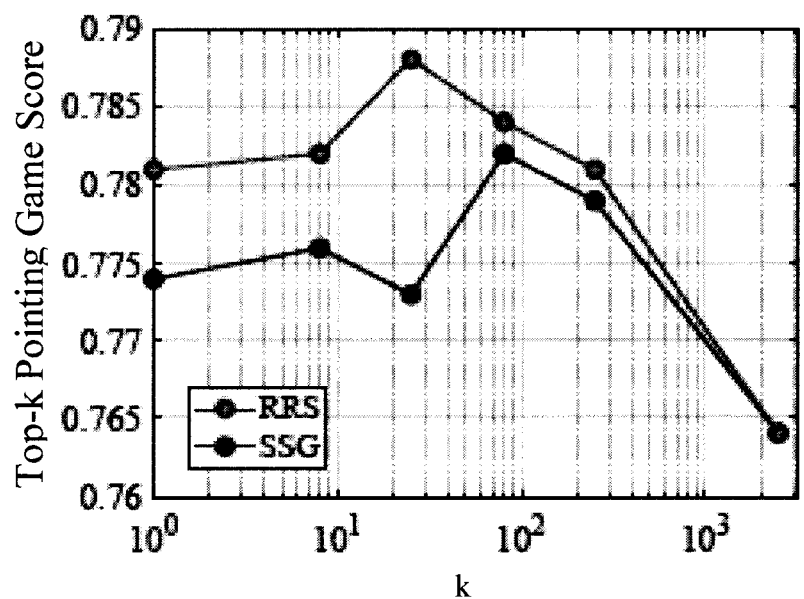
FIG. 8B is a diagram illustrating the accuracy of the present Rényi-Robust-Smooth approach according to an embodiment of the present invention.

FIGS. 8A and 8B are diagrams illustrating the β-top-k robustness and the accuracy, respectively, of the present Rényi-Robust-Smooth approach. The labels RRS and SSG refer to Rényi-Robust-Smooth and Sparsified SmoothGrad, respectively. In FIG. 8A, (E) and (T) corresponds to the experimental and theoretical robustness, respectively.

With regard to experimental Robustness, FIG. 8A shows the β-top-k robustness of the present Rényi-Robust-Smooth approach in comparison with Sparsified SmoothGrad. Here, a transfer-perturbation setting is adopted, where a perturbation to the top-2500 of Simple Gradient is applied to both the present approach and to Sparsified SmoothGrad. FIG. 8A plots the top-k overlapping ratio β between the interpretation of the original image x and the adversarial example $\tilde{x}$. The present approach has consistently better robustness (~10%) than Sparsified SmoothGrad under different settings on k. See also, table 900 in FIG. 9 (described below) for the experimental robustness comparison when the parameters T are different.

The dash lines in FIG. 8A present the theoretical robustness bound under $\ell_\infty$-norm attack. One can see that the robustness bound with the present RRS is much tighter than the bound provided in SSG. This because the tool used in SSG is hard to be generalized to $\ell_\infty$-norm attack, and a direct transfer from $\ell_2$-norm to $\ell_\infty$-norm will result in an extra loss of $\Theta(\sqrt{n})$.

Accuracy is another main concern of interpretation maps. That is, to what extent the main attributes of an interpretation overlap with the annotated objects. A generalization of a pointing game was used to evaluate the performance of the present attribution approach. In a standard pointing game, an interpretation method calculates the interpretation map and compare it with the annotated object. If the top pixel in the interpretation map is within the object, a score of "+1" will be granted to the object. Otherwise, a score of "−1" will be granted. The pointing game score is the average score of all objects.

However, not only the top-1 pixel affects the quality of interpretation maps. Hence, the idea of the pointing game is generalized here to the top-k pixels by checking the ratio of top-k pixels of interpretation map within the region of the object and applying the same procedure as the standard pointing game. FIG. 8B shows the result of top-k pointing game on various interpretation maps. The annotated object position in the VOC2007 dataset is taken as the ground-truth. The parameters of Sparsified SmoothGrad and the present approach are both the same as the settings described in conjunction with the description of FIG. 8A, above. Advantageously, the accuracy of the present approach was better than Sparsified SmoothGrad, even though robustness is usually considered an opposite property of accuracy.

Figure 9:
FIG. 9 is a diagram illustrating the top-k robustness of the present Rényi-Robust-Smooth approach and Sparsified SmoothGrad when the number of samples T is small according to an embodiment of the present invention.

Computational efficiency is another main concern of interpretation methods. However, most previous works on interpretation of certified robustness did not pay much attention to the computational efficiency. If the settings of those works are applied to larger images (i.e., ImageNet or VOC figures) or complex convolutional neural networks (i.e., VGG or GoogleLeNet), it may take hours to generate a single interpretation map. Thus, the performance of the present approach was experimentally verified when the number of generated noisy interpretations T is no larger than 30. Here, T can be used as a measure of computational resources because the time to compute on a noisy interpretation map is similar in the present approach and Sparsified SmoothGrad. It is also notable that the time taken by other steps are negligible in comparison with computing the noisy interpretations. Table 900 in FIG. 9 shows the top-k robustness of the present approach and Sparsified SmoothGrad when T is small. It was observed that the robustness of both approaches will decrease when T becomes smaller. However, the robustness of the present approach robustness decreases much slower than Sparsified SmoothGrad when the computational resources become more limited. When T=5, Rényi-Robust-Smooth becomes more than twice as robust as Sparsified SmoothGrad.

The following is a proof of the Theorem 1 that was described in conjunction with the description of FIG. 4, above. By the definition of m and $\tilde{m}$, $$R_\alpha(\mathbb{E}[m]\|\mathbb{E}[\tilde{m}]) = \frac{1}{\alpha-1}\ln\left(\prod_{i=1}^n \frac{\left(\sum_{j=1}^n v_j p_{(i,j)}\right)^\alpha}{\left(\sum_{j=1}^k v_j \tilde{p}_{(i,j)}\right)^{\alpha-1}}\right).$$

Applying generalized Radon's inequality provides, $$R_\alpha(\mathbb{E}[m]\|\mathbb{E}[\tilde{m}]) = \frac{1}{\alpha-1}\ln\left(\sum_{j=1}^n v_j \cdot \frac{p_{(i,j)}^\alpha}{\tilde{p}_{(i,j)}^{\alpha-1}}\right).$$

The $(\alpha,\epsilon)$-RDP property of '$g_t(x)$ provides $$\frac{1}{\alpha-1}\ln\left(\sum_{j=1}^n \frac{p_{(i,j)}^\alpha}{\tilde{p}_{(i,j)}^{\alpha-1}}\right) \le \epsilon.$$

Using the condition of $\|v\|_1 = 1$ and $v_i \le 1$, $$R_\alpha(\mathbb{E}[m]\|\mathbb{E}[\tilde{m}]) \le \epsilon.$$

By now, RDP has already been connected with the robustness on the measure of Rényi divergence.

The following is a proof of the Theorem 2 that was described in conjunction with the description of FIG. 4, above. Mathematically, the minimum change in Rényi divergence to violet the requirement of β-top-k robustness (i.e., the overlapping ratio less than β) is calculated. That is, calculate $$\min_{\mathbb{E}[\tilde{m}] \text{ s.t. } V_k(\mathbb{E}[m],\mathbb{E}[\tilde{m}]) \le \beta} R_\alpha(\mathbb{E}[m]\|\mathbb{E}[\tilde{m}]).$$

In all remaining proof of Theorem 2, $m_i$ and $\tilde{m}_i$ are used to represent $\mathbb{E}[m_i]$ and $\mathbb{E}[\tilde{m}_i]$ respectively. Without loss of generality, it is assumed that $m_1 \ge \ldots \ge m_n$. Then, it is shown that $\tilde{m}_1 \ge \ldots \ge m_{k-k_0-1} \ge \tilde{m}_{k-k_0} = \ldots = \tilde{m}_{k+k_0+1} \ge \tilde{m}_{k+k_0+2} \ge \ldots \ge \tilde{m}_n$ is needed to reach the minimum of Rényi divergence. To simplify notation, it is provided that $$s(\mathbb{E}[m_i]\|\mathbb{E}[\tilde{m}]) = \sum_{i=1}^n m_i\left(\frac{\tilde{m}_i}{m_i}\right)^\alpha.$$

It can be seen that $s(\mathbb{E}[m_i]\|\mathbb{E}[\tilde{m}])$ reaches the minimum on the same condition as $R_\alpha(\mathbb{E}[m_i]\|\mathbb{E}[\tilde{m}])$ To outline the proof, the following claims are proven:
1° [Natural] To reach the minimum, there is exactly $k_0$ different components in the top-k of $\mathbb{E}[m_i]$ and $\mathbb{E}[\tilde{m}_i]$.
2° To reach the minimum, $\tilde{m}_{k-k_0}, \ldots, \tilde{m}_k$ are not in the top-k of $\mathbb{E}[\tilde{m}]$.
2°' To reach the minimum, $\tilde{m}_{k+1}, \ldots, \tilde{m}_{k+k_0+1}$ appears in the top-k of $\mathbb{E}[\tilde{m}]$.

3° To reach the minimum, one must have $\tilde{m}_i \ge \tilde{m}_j$ for any $i \le j$.

It can be seen that the above claims on $\mathbb{E}[\tilde{m}]$ are equivalent to the following Karush-Kuhn-Tucker (KKT) condition:

$$\min_{\tilde{m}_1 \ldots, \tilde{m}_n} \sum_{i=1}^n m_i\left(\frac{\tilde{m}_i}{m_i}\right)^\alpha$$

subject to $\sum_{i=1}^n \tilde{m}_i = 1$ subject to $\tilde{m}_j - \tilde{m}_i \le 0, \forall i < k$ subject to $-\tilde{m}_i \le 0, \forall i \in [k]$ subject to $\tilde{m}_j - \tilde{m}_i = 0, \forall i, j \in S$ Solving this, it is known that $s(\mathbb{E}[m_i]\|\mathbb{E}[\tilde{m}])$ reaches minimum when $$\forall i \in S, \tilde{m}_i = \frac{\breve{m}}{2k_0\breve{m} + \sum_{i \notin S} m_i} \text{ and } \forall i \notin S, \tilde{m}_i = \frac{m_i}{2k_0\breve{m} + \sum_{i \notin S} m_i},$$

wherein $\breve{m} = \left(\frac{1}{2k_O}\sum_{i \in S}(m_i)^{1-\alpha}\right)^{\frac{1}{1-\alpha}}.$ Plugging in the above condition provides, $$\min_{\mathbb{E}[\tilde{m}] \text{ s.t. } V_k(\mathbb{E}[m],\mathbb{E}[\tilde{m}]) \le \beta} R_\alpha(\mathbb{E}[m]\|\mathbb{E}[\tilde{m}]) = -\ln\left(2k_0\left(\frac{1}{2k_0}\sum_{i \in S}(m_i)^{1-\alpha}\right)^{\frac{1}{1-\alpha}} + \sum_{i \notin S} m_i\right).$$

It is then known that the β-top-k robustness condition will be filled if the Rényi divergence does not exceed the above value.

The following are proofs of the claims used in the proof of Theorem 2 (see above):
1° [Natural] To reach the minimum, there are exactly $k_0$ different components in the top-k of $\mathbb{E}[m]$ and $\mathbb{E}[\tilde{m}]$.
Proof. Assume that $i_1, \ldots, i_{k_0+j}$ are the components not in the top-k of m but in the top-k of $\tilde{m}$. Similarly, let $i'_1, \ldots, i'_{k_0+j}$ to denote the components in the top-k of m but not in the top-k of $\tilde{m}$. Consider another $\tilde{m}^{(2)}$ having the same value with $\tilde{m}$ while $$\tilde{m}_{i_{k_0+j}}$$

is replaced by $$\tilde{m}'_{i_{k_0+j}}.$$

In other words, there are $k_0+j$ displacements in the top-k of $\tilde{m}$ while there are $k_0+j-1$ displacements in the top-k of $\tilde{m}^{(2)}$. Thus, $$s(\mathbb{E}[m]\|\mathbb{E}[\tilde{m}^{(2)}]) - s(\mathbb{E}[m]\|\mathbb{E}[\tilde{m}])$$

$$= \left( \frac{(\tilde{m}_{i'_{k_0+j}})^\alpha}{\left(m_{i_{k_0+j}}\right)^{\alpha-1}} + \frac{(\tilde{m}_{i_{k_0+j}})^\alpha}{\left(m_{i'_{k_0+j}}\right)^{\alpha-1}} \right) - \left( \frac{(\tilde{m}_{i_{k_0+j}})^\alpha}{\left(m_{i'_{k_0+j}}\right)^{\alpha-1}} + \frac{(\tilde{m}_{i'_{k_0+j}})^\alpha}{\left(m_{i_{k_0+j}}\right)^{\alpha-1}} \right).$$

Because $$m_{i_{k_0+j}} \geq m_{i'_{k_0+j}}$$

and $$\tilde{m}_{i_{k_0+j}} \leq \tilde{m}_{i'_{k_0+j}},$$

it is provided that $s(\mathbb{E}[m_i] \| \mathbb{E}[\tilde{m}^{(2)}]) - s(\mathbb{E}[m_i] \| \mathbb{E}[\tilde{m}]) \leq 0$. Thus, reducing the number of misplacements in top-k can reduce the value of $s(\mathbb{E}[m] \| \mathbb{E}[\tilde{m}])$. If at least $k_0$ displacements are required, then the minimum of $s(\mathbb{E}[m] \| \mathbb{E}[\tilde{m}])$ must be reached when there are exactly $k_0$ displacements.

2° To reach the minimum, $\tilde{m}_{k-k_0}, \ldots, \tilde{m}_k$ are not in the top-k of $\mathbb{E}[\tilde{m}]$.

Proof. Assume that $i_1, \ldots, i_{k_0}$ are the components not in the top-k of m but in the top-k of $\tilde{m}$. Similarly, $i'_1, \ldots, i'_{k_0}$ denotes the components in the top-k of m but not in the top-k of $\tilde{m}$. Consider another $\tilde{m}^{(2)}$ with the same value with $\tilde{m}$ while $\tilde{m}_{i_j}$ is replaced by $\tilde{m}_{j'}$, where $\tilde{m}_{j'}$ is in the top-k of $\tilde{m}$ and $m_{j'} \geq m_{i_j}$. In other words, $\tilde{m}_{j'}^{(2)}$ is no longer in the top-k components of $\tilde{m}$ while $\tilde{m}_{i_j}^{(2)}$ goes back to the top-k of $\tilde{m}_{i_j}^{(2)}$. Note again that $m_{j'} \geq m_{i_j}$ and $j' \leq i_j$. Thus, $$s(\mathbb{E}[m] \| \mathbb{E}[\tilde{m}^{(2)}]) - s(\mathbb{E}[m] \| \mathbb{E}[\tilde{m}])$$

$$= \left( \frac{(\tilde{m}_{i_j})^\alpha}{\left(m_{j'}\right)^{\alpha-1}} + \frac{(\tilde{m}_{j'})^\alpha}{\left(m_{i_j}\right)^{\alpha-1}} \right) - \left( \frac{(\tilde{m}_{j'})^\alpha}{\left(m_{j'}\right)^{\alpha-1}} + \frac{(\tilde{m}_{i_j})^\alpha}{\left(m_{i_j}\right)^{\alpha-1}} \right).$$

Note that $\tilde{m}_{i_j} \leq \tilde{m}_{j'}$, and $s(\mathbb{E}[m] \| \mathbb{E}[\tilde{m}^{(2)}]) - s(\mathbb{E}[m] \| \mathbb{E}[\tilde{m}]) \geq 0$. Thus, "moving a larger component out from top-k while moving a smaller component back to top-k" will make $s(\cdot \| \cdot)$ larger. Then, 2° follows by induction.

2°' To reach the minimum, $\tilde{m}_{k+1}, \ldots, \tilde{m}_{k+k_0+1}$ appears in the top-k of $\mathbb{E}[\tilde{m}]$, which holds according to the same reasoning as 2°.

The following is a proof of the Lemma 4 that was described in conjunction with the description of FIG. 4, above. By the definition of Rényi divergence, $$D_\alpha(x \| x') \approx \frac{1}{\alpha - 1} \cdot \ln \int_{-\infty}^{\infty} \frac{b \cdot \exp\left(-\left(\frac{x-\mu}{\sigma^*}\right)^b\right)}{2\sigma^* \Gamma(1/b)} \frac{\exp\left(-\alpha\left(\frac{x}{\sigma^*}\right)^b\right)}{\exp\left(-\alpha\left(\frac{x-\mu}{\sigma^*}\right)^b\right)} dx$$

Because the behavior of $D_\alpha$ when $\alpha \to 1$ is of interest, to simplify notation, it is provided that $\delta = \alpha - 1$. When $\alpha - 1 \to 0$, a first-order approximation is applied to $\exp(\cdot)$, $$D_\alpha(x \| x') \approx -\delta^{-1} \cdot \ln \int_{-\infty}^{\infty} \frac{b \cdot \exp\left(-\left(\frac{x}{b^*}\right)^b\right)}{2\sigma^* \Gamma(1/b)} \left(1 - \delta\left(\frac{x}{\sigma^*}\right)^b + \delta\left(\frac{x-\mu}{\sigma^*}\right)^b\right) dx.$$

It is notable that the first order approximation is exact when $\alpha \to 1$. Thus, all "$\approx$" become "=" when $\alpha \to 1$. Because $$\frac{b \cdot \exp\left(-\left(\frac{x}{\sigma^*}\right)^b\right)}{2\sigma^* \Gamma(1/b)}$$

is the probability density function (PDF) of $\mathcal{G}(0, \sigma, b)$, then $$D_\alpha(x \| x') \approx -\delta^{-1} \cdot \ln \left[ 1 + \delta \int_{-\infty}^{\infty} \frac{b \cdot \exp\left(-\left(\frac{x}{\sigma^*}\right)^b\right)}{2\sigma^* \Gamma(1/b)} \left( -\left(\frac{x}{\sigma^*}\right)^b + \left(\frac{x-\mu}{\sigma^*}\right)^b \right) dx \right].$$

By applying first-order approximation to $\ln(\cdot)$, $$D_\alpha(x \| x') \approx \int_{-\infty}^{\infty} \frac{b \cdot \exp\left(-\left(\frac{x}{b^*}\right)^b\right)}{2\sigma^* \Gamma(1/b)} \left( \left(\frac{x-\mu}{\sigma^*}\right)^b - \left(\frac{x}{\sigma^*}\right)^b \right) dx.$$

Expanding $\left(\frac{x-\mu}{\sigma^*}\right)^b$ provides, $$D_\alpha(x \| x') \approx \int_{-\infty}^{\infty} \frac{b \cdot \exp\left(-\left(\frac{x}{\sigma^*}\right)^b\right)}{2\sigma^* \Gamma(1/b)} \sum_{i=1}^{b} \binom{i}{b} \left(\frac{\mu}{\sigma^*}\right)^i \left(\frac{x}{\sigma^*}\right)^{b-i} dx.$$

When $b-i$ is odd, $$\left(-\left(\frac{x}{\sigma^*}\right)^b\right)\left(\frac{x}{\sigma^*}\right)^{b-i}$$

is an odd function and the integral will be zeros. When $b-i$ is even, it will become an even function. Thus, $$D_\alpha(x \| x') \approx \int_0^{\infty} \frac{b \cdot \exp\left(-\left(\frac{x}{\sigma^*}\right)^b\right)}{\sigma^* \Gamma(1/b)} \sum_{i=1}^{b/2} \binom{2i}{b} \left(\frac{\mu}{\sigma^*}\right)^{2i} \left(\frac{x}{\sigma^*}\right)^{b-2i} dx.$$

Through substituting $$\left(\frac{x}{\sigma^*}\right)^b, D_\alpha(x \| x') \approx \int_0^{\infty} \frac{\exp(-y)}{\Gamma(1/b)} \sum_{i=1}^{b/2} \binom{2i}{b} \left(\frac{\mu}{\sigma^*}\right)^{2i} y^{(1-2i)/b} dy.$$

Finally, Lemma 4 follows by the definition of Gamma function.

The following is a formal version of Theorem 5 (with proof) that was described in conjunction with the description of FIG. 4, above. Before presenting Theorem 5, a technical lemma is first provided for the concentration bound for $$\phi(m) = 2k_0 \left( \frac{1}{2k_0} \sum_{i \in S} (m_{i^*})^{1-\alpha} \right)^{\frac{1}{1-\alpha}} - \sum_{i \in S} m_{i^*}.$$

Considering that $\|m\|_1 = 1$, it is provided that $\epsilon_{robust} = -\ln(1 + \phi(m))$. To simplify notation, let $$\psi(m) = \left(\frac{1}{2k_0}\sum_{i\in S}(m_{i^*})^{1-a}\right)^{\frac{1}{1-a}}.$$

Thus $\phi(m)+2k_0\psi(m)=\Sigma_{i\in S}m_{i^*}$.

Lemma 6: using the above notations:

$$Pr[\phi(m) \leq \phi(\hat{m}) + \delta] \leq 1 - n\cdot\exp\left(-2T\delta^2\left[\psi^a(\hat{m})\left(\sum_{i\in S}\hat{m}_{i^*}^{-a}\right) - 2k_0\right]^2\right).$$

Proof the following statement is first proven: if for all $i\in[n]$, $|\hat{m}_i-m_i|\leq\delta$, it is always that:

$$\phi(m) - \phi(\hat{m}) \leq \delta\left[\psi^a(\hat{m})\left(\sum_{i\in S}\hat{m}_{i^*}^{-a}\right) - 2k_0\right], \quad (10)$$

wherein $\phi(\cdot)$ is a concave function when all components of the input vector are positive. Thus, if $\phi(m)\geq\phi(\hat{m})$, $$\phi(m) - \phi(\hat{m}) \leq \sum_{i\in S}(m_{i^*} - \hat{m}_{i^*})\cdot\frac{\partial\phi(m)}{\partial m_{i^*}}|_{m=\hat{m}}.$$

Then, Inequality 10 follows by the fact that $$\frac{\partial\phi(m)}{\partial m_{i^*}} = m_{i^*}^{-a}\cdot\psi^a(m).$$

Then, according to Hoeffding bound:

$$Pr[\forall i\in[n],|\hat{m}_i-m_i|\leq\delta]\geq 1-n\cdot\exp(-2T\delta^2).$$

Because $[\forall i\in[n],|\hat{m}_i-m_i|\leq\delta]$ is a special case of $[\phi(m)\leq\phi(\hat{m})+\delta]$, Lemma 6 follows.

Theorem 5 (formal) Using the notations above, $$Pr\left[\in_{robust} \geq \hat{\in}_{robust} - \delta\right] \leq$$
$$1 - n\cdot\exp\left(-2T(e^{-\delta}-1)^2\left[\psi^a(\hat{m})\left(\sum_{i\in S}\hat{m}_{i^*}^{-a}\right) - 2k_0\right]^2\right).$$

Proof. Theorem 5 follows by applying $\in_{robust}=-\ln(1+\phi(m))$ to Lemma 6.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for generating an interpretation map, the method comprising:
   adding generalized Gaussian noise to an image x to obtain T noisy images, wherein the generalized Gaussian noise constitutes perturbations to the image x;
   providing the T noisy images as input to a convolutional neural network;
   calculating T noisy interpretations of output from the convolutional neural network corresponding to the T noisy images, wherein the T noisy interpretations comprise images that illustrate how important each pixel in the image x is for classification by the convolutional neural network;
   re-scaling the T noisy interpretations using a scoring vector υ to obtain T re-scaled noisy interpretations; and
   generating the interpretation map using the T re-scaled noisy interpretations, wherein the interpretation map is robust against the perturbations, and wherein the perturbations are constrained by an $\ell_d$-norm for any $d\geq 1$, including $d=\infty$.

2. The method of claim 1, further comprising:
   independently repeating the adding T times on the input image x to obtain the T noisy images.

3. The method of claim 2, wherein T is from about 20 to about 200 and ranges therebetween.

4. The method of claim 1, further comprising:
   adding the generalized Gaussian noise to each pixel of the input image x.

5. The method of claim 1, further comprising:
   drawing the generalized Gaussian noise from a generalized normal distribution $\mathcal{G}$ ($\mu,\sigma,b$).

6. The method of claim 3, wherein a random variable X follows the generalized normal distribution $\mathcal{G}$ ($\mu,\sigma,b$) if its probability density function is:

$$\frac{b\cdot\sqrt{\frac{\Gamma(3/b)}{\Gamma(1/b)}}}{2\sigma\Gamma(1/b)}\cdot\exp\left[-\left(\sqrt{\frac{\Gamma(3/b)}{\Gamma(1/b)}}\cdot\frac{|x-\mu|}{\sigma}\right)^b\right],$$

wherein $\mu$ correspond to an expectation of X, $\sigma$ correspond to a standard deviation of X and b correspond to a shape factor of X.

7. The method of claim 1, wherein the scoring vector $\upsilon=(\upsilon_1,\ldots,\upsilon_n)$, and wherein the method further comprises:
   setting $\upsilon_1\geq\ldots\geq\upsilon_n$ for the scoring vector $\upsilon$.

8. The method of claim 1, wherein the T noisy interpretations are calculated using an interpreter g.

9. The method of claim 8, wherein the T noisy interpretations comprise saliency maps.

10. A system for generating an interpretation map, the system comprising:
    a convolutional neural network; and
    an apparatus comprising a processor, connected to a memory, operable to:
      add generalized Gaussian noise to an image x to obtain T noisy images, wherein the generalized Gaussian noise constitutes perturbations to the image x;
      provide the T noisy images as input to the convolutional neural network;
      calculate T noisy interpretations of output from the convolutional neural network corresponding to the T noisy images, wherein the T noisy interpretations comprise images that illustrate how important each pixel in the image x is for classification by the convolutional neural network;
      re-scale the T noisy interpretations using a scoring vector u to obtain T re-scaled noisy interpretations; and
      generate the interpretation map using the T re-scaled noisy interpretations, wherein the interpretation map is robust against the perturbations, and wherein the perturbations are constrained by an $\ell_d$-norm for any $d\geq 1$, including $d=\infty$.

11. The system of claim 10, wherein the processor is further operable to:
independently repeat adding the generalized Gaussian noise T times to the input image x to obtain the T noisy images.

12. The system of claim 10, wherein the processor is further operable to:
add the generalized Gaussian noise to each pixel of the input image x.

13. The system of claim 10, wherein the processor is further operable to:
draw the generalized Gaussian noise from a generalized normal distribution $\mathcal{G}$ ($\mu,\sigma,b$).

14. The system of claim 13, wherein a random variable X follows the generalized normal distribution $\mathcal{G}$ ($\mu,\sigma,b$) if its probability density function is:

$$\frac{b \cdot \sqrt{\frac{\Gamma(3/b)}{\Gamma(1/b)}}}{2\sigma\Gamma(1/b)} \cdot \exp\left[-\left(\sqrt{\frac{\Gamma(3/b)}{\Gamma(1/b)}} \cdot \frac{|x-\mu|}{\sigma}\right)^b\right],$$

wherein $\mu$ correspond to an expectation of X, $\sigma$ correspond to a standard deviation of X and b correspond to a shape factor of X.

15. The system of claim 10, wherein the scoring vector $\upsilon=(\upsilon_1, \ldots, \upsilon_n)$, and wherein the processor is further operable to:
set $\upsilon_1 \geq \ldots \geq \upsilon_n$ for the scoring vector $\upsilon$.

16. The system of claim 10, wherein the T noisy interpretations are calculated using an interpreter g.

17. A non-transitory computer program product for generating an interpretation map, the computer program product comprising a computer readable storage medium having program instructions embodied therewith, the program instructions executable by a computer to cause the computer to:
add generalized Gaussian noise to an image x to obtain T noisy images, wherein the generalized Gaussian noise constitutes perturbations to the image x;
provide the T noisy images as input to a convolutional neural network;
calculate T noisy interpretations of output from the convolutional neural network corresponding to the T noisy images, wherein the T noisy interpretations comprise images that illustrate how important each pixel in the image x is for classification by the convolutional neural network;
re-scale the T noisy interpretations using a scoring vector $\upsilon$ to obtain T re-scaled noisy interpretations; and
generate the interpretation map using the T re-scaled noisy interpretations, wherein the interpretation map is robust against the perturbations, and wherein the perturbations are constrained by an $\ell_d$-norm for any $d \geq 1$, including $d=\infty$.

18. The non-transitory computer program product of claim 17, wherein the program instructions further cause the computer to:
draw the generalized Gaussian noise from a generalized normal distribution $\mathcal{G}$ ($\mu,\sigma,b$).

19. The non-transitory computer program product of claim 18, wherein a random variable X follows the generalized normal distribution $\mathcal{G}$ ($\mu,\sigma,b$) if its probability density function is:

$$\frac{b \cdot \sqrt{\frac{\Gamma(3/b)}{\Gamma(1/b)}}}{2\sigma\Gamma(1/b)} \cdot \exp\left[-\left(\sqrt{\frac{\Gamma(3/b)}{\Gamma(1/b)}} \cdot \frac{|x-\mu|}{\sigma}\right)^b\right],$$

wherein $\mu$ correspond to an expectation of X, $\sigma$ correspond to a standard deviation of X and b correspond to a shape factor of X.

20. The non-transitory computer program product of claim 19, wherein the scoring vector $\upsilon=(\upsilon_1, \ldots, \upsilon_n)$, and wherein the program instructions further cause the computer to:
set $\upsilon_1 \geq \ldots \geq \upsilon_n$ for the scoring vector $\upsilon$.

* * * * *